United States Patent [19]

Shidlovsky

[11] 4,020,147
[45] Apr. 26, 1977

[54] METHOD FOR PREPARING CATHODOCHROMIC SODALITE

[75] Inventor: Igal Shidlovsky, Princeton, N.J.
[73] Assignee: RCA Corporation, New York, N.Y.
[22] Filed: June 2, 1975
[21] Appl. No.: 583,185
[52] U.S. Cl. .................. 423/329; 252/301.4 F; 423/328
[51] Int. Cl.² ............... C01B 33/26; C09K 11/08
[58] Field of Search ............ 423/329, 330, 328; 252/301.4 F

[56] References Cited

UNITED STATES PATENTS 3,773,540  11/1973  Shidlovsky .............. 252/301.4 F

OTHER PUBLICATIONS

Williams et al. "J. American Ceramic Society" vol. 52, No. 3, 1969, pp. 139–145.
Hackh's Chemical Dictionary, Fourth Edition, 1969, p. 183.
Zhdanov "Molecular Sieve Zeolites–I" Copyright 1971 ACS, pp. 20–36.

*Primary Examiner*—Edward J. Meros
*Attorney, Agent, or Firm*—Glenn H. Bruestle; Carl L. Silverman

[57] ABSTRACT

Extremely small, e.g., 2 micron diameter, cathodochromic sodalite particles are prepared through a hydrothermal method. The method includes the steps of uniformly heating a sealed reaction vessel which contains a water slurry of $Al_2O_3$, $SiO_2$, NaOH and NaX wherein X is at least one member of the group consisting of Cl-, Br-, and I-. The heating may be done at a temperature below about 356° C. The heating is continued for an extended period of time to allow for dissolution of $Al_2O_3$ and $SiO_2$. The reaction vessel is then rapidly cooled so as to precipitate uniform size spherical particles of sodalite. The particles of sodalite are then sensitized. The sensitized sodalite particles are well suited for use in cathodochromic screens, i.e., screens employing these particles exhibit high sensitivity, high contrast, and high resolution.

10 Claims, 4 Drawing Figures

⊢⎯⎯⊣ 5μ

METHOD FOR PREPARING CATHODOCHROMIC SODALITE

BACKGROUND OF THE INVENTION

This invention relates to a hydrothermal method of preparing cathodochromic sodalite, and particularly to such a method in which sodalite particles of extremely small size, e.g., 2 microns, can be prepared.

The term cathodochromic material, as used herein, refers to materials which can be colored by means of electron beam bombardment and in which coloration can be removed by means of heat or light. The use of sodalite as a cathodochromic material in dark trace cathode ray tubes is well known. Sodalites have the general formula $Na_6Al_6Si_6O_{24} \cdot 2NaX$ where X is Cl—, Br—, and/or I—. Important features of any cathodochromic device, e.g., a dark trace cathode tube, are the contrast ratio, gray scale, and resolution of the cathodochromic material used therein. The contrast ratio of cathodochromic sodalite is very high, at least 20:1, and usually better than 50:1. The sensitivity of the sodalite to the electron beam is very high and shows gray scale with many steps. However, the resolution of the image lines on sodalite screens is limited by the size of the sodalite particles. Consequently, resolution of a cathodochromic device employing sodalite particles is improved by decreasing the size of the particles used. Also, small sized particles, i.e., less than 7 microns in diameter, are especially desirable since the sodalite material can then be more efficiently sensitized.

U.S. Pat. No. 3,773,540, issued Nov. 20, 1973, disclosed a hydrothermal method of preparing cathodochromic sodalite particles wherein the particles exhibited a size of about 4–6 microns in diameter. Although the hydrothermal method disclosed in the previously mentioned U.S. Patent is satisfactory for many applications; it is not desirable for preparing cathodochromic sodalite particles of extremely small size, e.g., about 2 microns in diameter. Furthermore, the hydrothermal method disclosed that, in general, the starting materials had to be heated above the critical temperature, about 356° C, which is required for the formation of sodalite. Thus, it would be desirable to develop a method of preparing cathodochromic sodalite particles from which cathodochromic screens having improved resolution and sensitivity can be prepared.

SUMMARY OF THE INVENTION

An improved hydrothermal growth method for preparing cathodochromic sodalite particles includes the steps of uniformly heating a sealed reaction tube containing a water slurry of $Al_2O_3$, $SiO_2$, NaOH and NaX wherein X is at least one member of the group consisting of Cl—, Br—, and I—; continuing the uniform heating for an extended period of time to allow for the dissolution of $Al_2O_3$ and $SiO_2$; and rapidly cooling the reaction tube so as to precipitate uniform sized spherical particles of sodalite. The improvement includes uniformly heating the sealed reaction tube to a temperature below about 356° C.

DETAILED DESCRIPTION OF THE INVENTION

Figure 1:
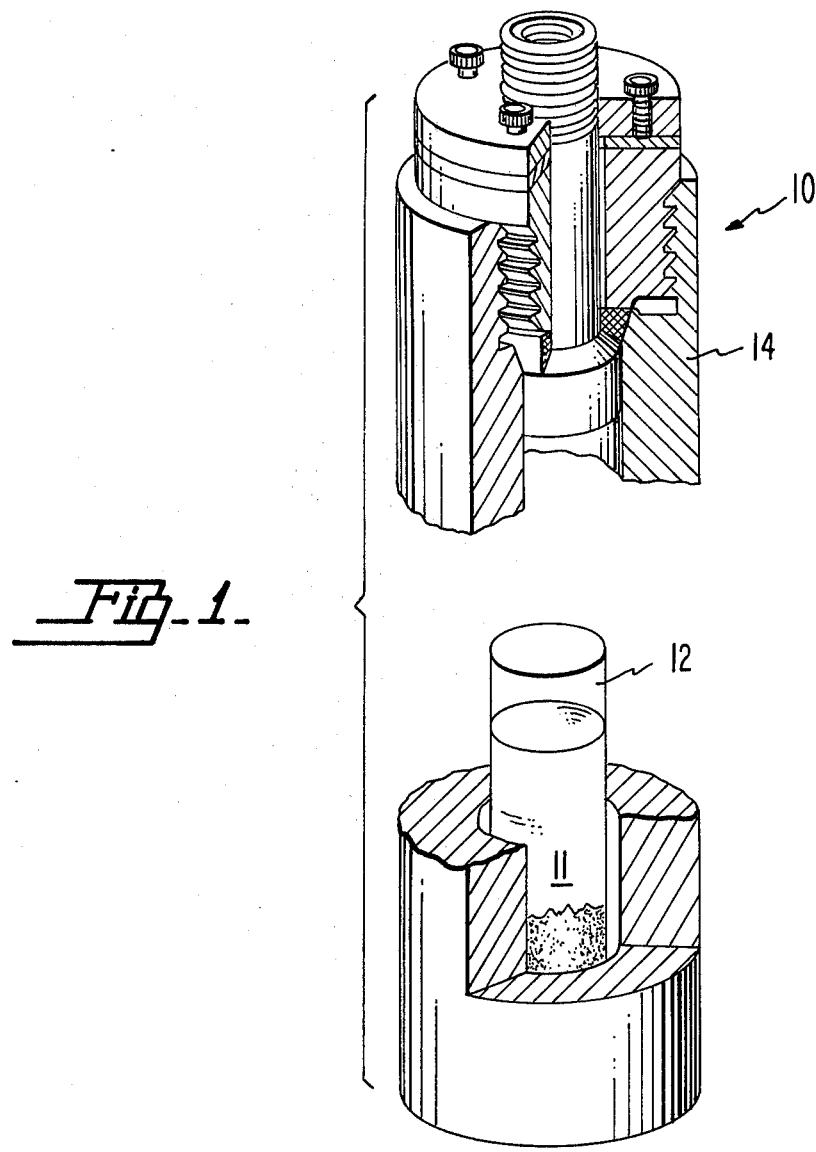
FIG. 1 is a partially broken away exploded front view of one form of apparatus suitable for use in the method of the present invention.

Referring initially to FIG. 1, one form of apparatus suitable for use in the method of the present invention is generally designated as 10. The basic apparatus is similar to that disclosed in previously mentioned U.S. Pat. No. 3,773,540. Typically, in a hydrothermal method for preparing cathodochromic sodalite particles, the starting materials 11 are placed in a sealed reaction tube 12 which is subsequently exposed to a combination of high temperature and high pressure. The reaction tube 12 is of a corrosive resistant material such as platinum. The starting materials 11 may comprise a thick water slurry of aluminum oxide ($Al_2O_3$) silicon dioxide ($SiO_2$), sodium hydroxide (NaOH) and sodium halide (NaX), wherein X is Cl—, Br—, and/or I—. The aluminum oxide and silicon dioxide in the slurry are present in stoichiometric proportions. The complexing materials, i.e., the sodium hydroxide and alkali halide, are present in excess of stoichiometric proportions. The reactants and the water are heated and diluted to a desired volume. If convenient, the starting materials 11 can be mixed in a separate container (not shown) and then transferred to the reaction tube 12.

The reaction tube 12 is sealed and then placed in a reaction vessel 14. The reaction vessel 14 provides a means of equalizing the pressure which develops internally in the reaction tube 12 when it is subsequently heated. In order to equalize this internal pressure, the reaction vessel 14 is filled with sufficient water so that the reaction vessel 14 contains the same volume percent filling i.e., water and reaction tube 12, as the reaction tube 12 contains of the starting materials 11, as is known in the art.

The reaction vessel 14, and the reaction tube 12 therein, are then heated and maintained at a uniform temperature without a gradient along the reaction vessel 14 so that no transport will occur in the reaction tube 12. The heating of the reaction tube 12 causes high internal pressure, e.g. 10,000 psi to 15,000 psi, to build up therein. To allow for the dissolution of the aluminum oxide and silicon dioxide in the form of complex anions and cations, heating of the starting materials 11 under the high internal pressure is continued for an extended period. Then, the heating is stopped abruptly and the reaction vessel 14 is rapidly cooled to room temperature. The cooling of the reaction vessel 14, and the reaction tube 12 therein, causes material in the reaction tube 12 to settle from the solution due to the reduction in solubility. The rapid cooling of the solution causes the material which settles from the solution to be in the form of small spherical or ball-shaped particles, instead of relatively large dodecahedral crystals.

As prepared, the sodalite particles are not cathodochromic i.e., sensitization is needed to develop the defects which are essential for the color centers. Sensitization can be accomplished by heating the particles to elevated temperatures in an inert or reducing atmosphere, e.g., heating to 900° C in an atmosphere of hydrogen or nitrogen, as is known in the art. Up to 20 weight percent of the alkali halide is diffused from the sodalite structure during the sensitization process. The weight loss is due to the evaporation of the sodium halide from the sodalite so as to cause the desired sodium and halogen vacancies in the sodalite which are suitable for the formation of color centers.

The exact amount of starting materials 11 employed in preparing sodalite powder, i.e., a plurality of sodalite particles, varies according to the size and percent of filling of the reaction tube 12 and to the amount of excess sodium hydroxide and sodium halide desired. Generally, the starting materials 11 contain sodium hydroxide and sodium halide in an excess of the stoichiometrically required quantities so as to result in above about 2N NaOH and above about 0.1N NaX in the supernatant liquid of the slurry. Since the solubility of the sodalite in the solution is a function of the temperature, pressure, and concentration of complexing agents, the specific temperature to which the reaction vessel will be heated will also vary. In addition, the heating time will vary with the particular amounts of starting materials and the reaction tube size.

However, it has now been found that the size of the sodalite particles obtained is directly related to the temperature of the heating, i.e., higher temperatures of heating correspond to larger particle size and lower temperatures correspond to smaller particle size. Also, in order to obtain the small particles of sodalite, it is desirable to employ aluminum oxide powder having a small particle size, i.e., less than 0.1 micron in diameter. Results are most desirable when using aluminum oxide particles of 0.05 micron in diameter.

In contradistinction to previously mentioned U.S. Pat. No. 3,773,540, it has now been discovered that desirable results, i.e., extremely small sodalite particles, can be obtained by heating the reaction tube to a temperature below about 356° C. For example, it has been found that cathodochromic sodalite particles of extremely small size, e.g., about 2 microns in diameter, can be prepared by heating a reaction tube 12 containing the appropriate solution to below about 356° C.

The invention can be further illustrated by the following examples, but it is to be understood that the invention is not meant to be limited to the details described therein.

EXAMPLE I 6.413 gm of $SiO_2$, 5.438 gm of $Al_2O_3$, 9.311 gm of NaOH, and 4.982 gm of NaBr were mixed together with water to form a slurry. The particles of $Al_2O_3$ exhibited an average diameter of about 0.05 microns. The slurry was heated and mixed and brought to a volume which filled 75% of the reaction tube. The final solution was 3.0 N NaOH and 0.3 N NaBr. The solution normality was calculated for the quantities of the mentioned material above the quantity which was needed for sodalite stoichiometry.

The reaction tube was placed in a reaction vessel and heated to a temperature of 300° C for 7 days. The approximate pressure during the heating was between 10,000 to 15,000 psi. After seven days of heating, the reaction vessel, with the reaction tube therein, was cooled rapidly to room temperature. The reaction tube was opened and the sodalite powder was washed with water and dried.

Figure 2:
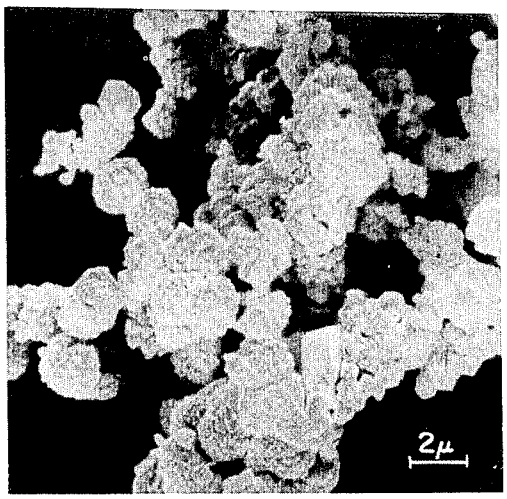
FIGS. 2, 3 and 4 are electron micrographs of cathodochromic sodalite particles prepared in accordance with the method of the present invention.

Sensitization of the sodalite particles was accomplished by heating to 900° C in hydrogen for 30 minutes. In the sensitization process, 15 weight percent of the sodium bromide diffused out of the sodalite while the sodalite structure was intact. The resultant cathodochromic sodalite particles can be seen in FIG. 2 wherein a scanning electron microscope picture of the sodalite particles is shown. The sodalite particles are spherically shaped with most of them being 2 microns in diameter. As synthesized, the sodalite was in the stoichiometric formula $Na_6Al_6Si_6O_{24}2NaBr$.

EXAMPLE II 12.825 gm of $SiO_2$ 10.876 gm of $Al_2O_3$, 18.804 gm of NaOH, 2.827 gm of NaCl and 4.981 gm of NaBr were mixed in water to form a slurry. The slurry was heated and mixed and brought to a volume which filled 75% of the reaction tube. The quantities of the reacting materials were calculated so the normality of the solution was 3.0 N NaOH, 0.15N NaCl, and 0.15N NaBr. The solution normality was calculated for the quantities of the reactants above the quantity needed for sodalite stoichiometry. The reaction tube was sealed and heated for seven days at 325° C. At the end of the heating period the reaction vessel was cooled rapidly to room temperature. The reaction product was washed and dried and was in the form of white powder. The sodalite was a mixed chloride bromide.

Figure 3:
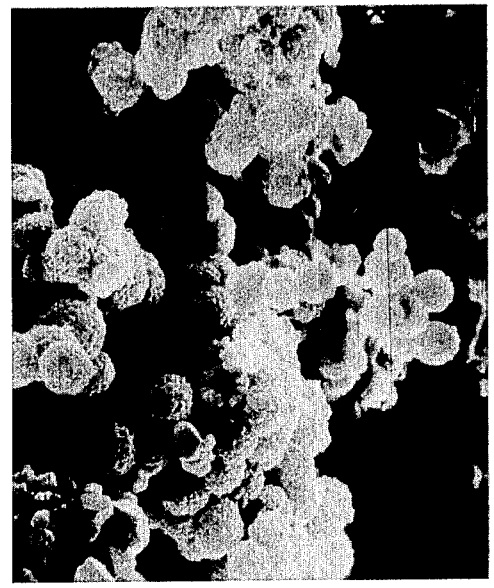

The powder was sensitized by heat treatment at 900° C in a hydrogen atmosphere. In the sensitization process, about 15 weight percent of the alkali halide diffused out of the sodalite while the sodalite structure was intact. The resultant cathodochromic sodalite particles can be seen in FIG. 3 wherein a scanning electron microscope picture of the sodalite particles is shown. The sodalite particles are spherically shaped with a diameter of about 3 microns. The sodalite particles appear to be built from sub-micron particles.

EXAMPLE III 12.6 gm of $SiO_2$, 10.684 gm of $Al_2O_3$, 9.879 gm of NaBr and 18.474 gm of NaOH were mixed in water to form a slurry. The slurry was treated as in the previous examples. The final solution was 3.0 N NaOH and 0.3 N NaBr. The reaction tube was filled to 70% of its volume. The mixture was reacted at 400° C for seven days. The resultant material was washed and dried.

Figure 4:
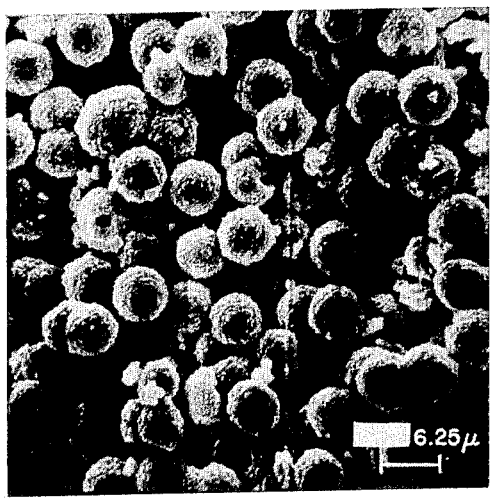

Sensitization was accomplished by heating to 900° C in hydrogen. Due to the sensitization, 11 weight percent of the NaBr diffused out of the sodaltie. The resultant cathodochromic particles can be seen in FIG. 4 wherein a scanning electron microscope picture of the sodalite particles is shown. The particles are spherically shaped and 5 to 6 microns in diameter. The particles appear to be built from small submicron particles.

I claim:

1. In a hydrothermal growth process for preparing sodalite particles which includes the steps of uniformly heating a sealed reaction tube containing a water slurry of $Al_2O_3$, $SiO_2$, NaOH and NaX wherein X is at least one member of the group consisting of Cl–, Br–, and I–; continuing said uniform heating for an extended period of time to allow for the dissolution of $Al_2O_3$ and $SiO_2$; and rapidly cooling said reaction tube so as to precipitate uniform sized spherical particles of sodalite having a particle size of less than 7 microns, wherein the improvement comprises:

uniformly heating said sealed reaction tube to a temperature of less than or equal to 325° C.

2. A method in accordance with claim 1 in which said $Al_2O_3$ in said slurry is in the form of particles which are less than 0.1 microns in diameter.

3. A method in accordance with claim 1 in which said slurry includes quantitites of NaOH and NaX in excess of stoichiometric quantities.

4. A method in accordance with claim 3 in which said slurry includes NaOH at a concentration in excess of 2N and NaX at a concentration in excess of 0.1N.

5. A method in accordance with claim 4 in which said slurry includes NaOH at a concentration of about 3N and NaX at a concentration of about 0.3N and in which said reaction tube is heated to a temperature of about 300° C thereby creating a pressure in said reaction tube in the range of about 10,000–15,000 psi.

6. A method in accordance with claim 4 in which X comprises $Br^-$.

7. A method in accordance with claim 4 in which X comprises $Cl^-$.

8. A method in accordance with claim 4 in which X comprises $I^-$.

9. A method in accordance with claim 4 which includes the step of sensitizing said sodalite particles by heating said sodalite particles at temperatures sufficient to remove at least some NaX from said sodalite.

10. A method in accordance with claim 9 in which said step of sensitizing said sodalite particles includes heating said sodalite particles at a temperature of about 900° C for a time sufficient to allow a loss of NaX from said sodalite of from 10–20 weight percent NaX.

* * * * *